United States Patent [19]
Hasz et al.

[11] Patent Number: 5,773,141
[45] Date of Patent: Jun. 30, 1998

[54] PROTECTED THERMAL BARRIER COATING COMPOSITE

[75] Inventors: Wayne Charles Hasz, Pownal, Vt.; Marcus Preston Borom, Niskayuna; Curtis Alan Johnson, Schenectady, both of N.Y.

[73] Assignee: General Electric Company, Schenectady, N.Y.

[21] Appl. No.: 666,055

[22] Filed: Jun. 19, 1996

Related U.S. Application Data

[63] Continuation of Ser. No. 417,577, Apr. 6, 1995, abandoned.

[51] Int. Cl.[6] .................................................. B32B 17/06
[52] U.S. Cl. ...................... 428/335; 428/497; 428/469; 428/472; 428/697; 428/699; 428/701; 428/702
[58] Field of Search .................................... 428/699, 697, 428/701, 702, 457, 469, 472, 334, 335

[56] References Cited

U.S. PATENT DOCUMENTS

| | | | |
|---|---|---|---|
| 3,837,894 | 9/1974 | Tucker, Jr. ............................. | 117/70 A |
| 4,588,607 | 5/1986 | Matrarese et al. ....................... | 427/34 |
| 5,032,577 | 7/1991 | Taira et al. .............................. | 501/135 |
| 5,080,977 | 1/1992 | Zaplatynsky ............................ | 428/432 |

OTHER PUBLICATIONS

"Fatigue of Thick Thermal Barrier Coatings", KF Wesling, et al., J. Am. Ceram. Soc., 77(7) pp. 1863–1868 (1994).

"Degradation of Thermal–Barrier Coatings at Very High Temperatures", FH Stott, et al., MRS Bulletin, pp. 46–50, Oct. 1994.

U.S. patent application, Ser. No. 08/415,913, filed Apr. 6, 1995.

U.S. patent application, Ser. No. 08/417,578, filed Apr. 6, 1995.

U.S. patent application, Ser. No. 08/415,912, filed Apr. 3, 1995.

U.S. patent application, Ser. No. 08/417,579, filed Apr. 6,1995.

U.S. paten application, Ser. No. 08/417,580, filed Apr. 6, 1995.

*Primary Examiner*—Archene Turner
*Attorney, Agent, or Firm*—Noreen C. Johnson; Douglas E. Stoner

[57] ABSTRACT

A composite that protects thermal barrier coatings on parts from the deleterious effects of environmental contaminants at operating temperatures with a sacrificial oxide coating is divulged. The thermal barrier coating composite decreases infiltration of molten contaminant compositions into openings in the thermal barrier coating to increase the life of the composite.

6 Claims, No Drawings

PROTECTED THERMAL BARRIER COATING COMPOSITE

This application is a Continuation of application Ser. No. 08/417.577 filed Apr. 6, 1995 now abandoned.

FIELD OF THE INVENTION

The present invention relates to a composite that protects thermal barrier coatings deposited on gas turbine and other heat engine parts from the deleterious effects of environmental contaminants. In particular, the invention relates to a thermal barrier coating having a protective sacrificial oxide coating adjacent to the outer surface of the thermal barrier coating.

BACKGROUND OF THE INVENTION

Thermal barrier coatings are deposited onto gas turbine and other heat engine parts to reduce heat flow and to limit the operating temperature of metal parts. These coatings generally are a ceramic material, such as chemically stabilized zirconia. Yttria-stabilized zirconia, scandia-stabilized zirconia, calcia-stabilized zirconia, and magnesia-stabilized zirconia are contemplated as thermal barrier coatings. The thermal barrier coating of choice is a yttria-stabilized zirconia ceramic coating. A typical thermal barrier coating comprises about 8 weight percent yttria-92 weight percent zirconia. The thickness of a thermal barrier coating depends on the application, but generally ranges between about 5–60 mils thick for high temperature engine parts.

Metal parts provided with thermal barrier coatings can be made from nickel, cobalt, and iron based superalloys. The process is especially suited for parts and hardware used in turbines. Examples of turbine parts would be turbine blades, buckets, nozzles, combustion liners, and the like.

Thermal barrier coatings are a key element in current and future gas turbine engine designs expected to operate at high temperatures which produce high thermal barrier coating surface temperatures. The ideal system for a hot high temperature engine part consists of a strain-tolerant thermal barrier ceramic layer deposited onto a bond coat which exhibits good corrosion resistance and closely matched thermal expansion coefficients.

Under service conditions, thermal barrier coated engine parts can be susceptible to various modes of damage, including erosion, oxidation, and attack from environmental contaminants. At temperatures of engine operation adherence of these environmental contaminants on the hot thermal barrier coated surface can cause damage to the thermal barrier coating. Environmental contaminants form compositions, which are liquid at the surface temperatures of thermal barrier coatings.

Chemical and mechanical interactions occur between the contaminant compositions and the thermal barrier coatings. Molten contaminant compositions can dissolve the thermal barrier coating or can infiltrate its pores and openings, initiating and propagating cracks causing delamination and loss of thermal barrier coating material.

Some environmental contaminant compositions that deposit on thermal barrier coated surfaces contain oxides of calcium, magnesium, aluminum, silicon, and mixtures thereof. These oxides combine to form contaminant compositions comprising calciummagnesium-aluminum-silicon-oxide systems (Ca—Mg—Al—Si—O), herein referred to as CMAS. Damage to thermal barrier coatings occurs when the molten CMAS infiltrates the thermal barrier coating. After infiltration and upon cooling, the molten CMAS, or other molten contaminant composition, solidifies. The stress build up in the thermal barrier coating is sufficient to cause spallation of the coating material and loss of the thermal protection that it provides to the underlying part.

There is a need to reduce or prevent the damage to thermal barrier coatings caused by the reaction or infiltration of molten contaminant compositions at the operating temperature of the engine. This can be accomplished by raising the melting temperature or viscosity of a contaminant composition when it forms on the hot surfaces of thermal barrier coated parts with a sacrificial oxide coating so that the contaminant composition does not form a reactive liquid or flow into the thermal barrier coating.

SUMMARY OF THE INVENTION

The present invention satisfies this need by providing a composite comprising a thermal barrier coating on a part with a continuous sacrificial oxide coating adjacent to an outer surface of the thermal barrier coating. The invention also includes a protected thermal barrier coated part comprising a part with a thermal barrier coating on said part and a single protective layer of a sacrificial oxide coating on an outer surface of said thermal barrier coating. The composite thermal barrier coating according to the present invention also comprises a substrate, bond coat, with a thermal barrier coating and a sacrificial oxide coating.

Environmental contaminants are materials that exist in the environment and are ingested into engines, from air and fuel sources, and impurities and oxidation products of engine components, such as iron oxide.

The term "operating temperature" means the surface temperature of the thermal barrier coating during its operation in a given application, such as a gas turbine engine. Such temperatures are above room temperature, and generally are above 500° C. High temperature operation of thermal barrier coated parts is usually above 1000° C.

DESCRIPTION OF THE INVENTION

It has been discovered that a composite comprising a thermal barrier coated part with an outer sacrificial oxide coating has decreased damage from environmental contaminants that form molten contaminant compositions on the surface of the thermal barrier coating at operating temperatures. It has further been discovered that by applying a sacrificial oxide coating that reacts with environmental contaminants and resulting liquid contaminant compositions, the melting temperature or viscosity of the contaminant composition can be increased. As a result, the contaminant composition does not become molten and infiltration or viscous flow of the mixture into the thermal barrier coating is curtailed. This reduces damage to the thermal barrier coating.

Increasing the melting temperature and viscosity of the contaminant composition reduces infiltration into the thermal barrier coating, thereby decreasing the degradation of the thermal barrier coated part. As a result of the sacrificial oxide coating being consumed or dissolved into the contaminant composition, the composition does not become liquid at the operating temperature of the thermal barrier coating. Infiltration or viscous flow of the contaminant composition into thermal barrier coating cracks, openings, and pores is diminished.

This invention also protects the thermal barrier coating from dissolution or spallation due to chemical and mechanical attack by the contaminant composition. This enhances the life of the thermal barrier coated part and thus, reduces thermal barrier coated part failure.

Sources of environmental contaminants include, but are not limited to, sand, dirt, volcanic ash, fly ash, cement, runway dust, substrate impurities, fuel and air sources, oxidation products from engine components, and the like. The environmental contaminants adhere to the surfaces of thermal barrier coated parts. At operating temperatures of the thermal barrier coating, the environmental contaminants then form contaminant compositions on surfaces of the thermal barrier coating which may have melting ranges or temperatures at or below the operating temperature.

In addition, the environmental contaminant may include magnesium, calcium, aluminum, silicon, chromium, iron, nickel, barium, titanium, alkali metals, and compounds thereof, to mention a few. The environmental contaminants may be oxides, phosphates, carbonates, salts, and mixtures thereof.

The chemical composition of the contaminant composition corresponds to the composition of the environmental contaminants from which it is formed. For example, at operational temperatures of about 1000° C. or higher, the contaminant composition corresponds to compositions in calcium-magnesium-aluminum-silicon oxide systems or CMAS. Generally, the environmental contaminant compositions known as CMAS comprise primarily a mixture of magnesium oxide (MgO), calcium oxide (CaO), aluminum oxide ($Al_2O_3$), and silicon oxide ($SiO_2$). Other elements, such as nickel, iron, titanium, and chromium, may be present in the CMAS in minor amounts when these elements or their compounds are present in the environmental contaminants. A minor amount is an amount less than about ten weight percent of the total amount of contaminant composition present.

The protective coating of this composite can be described as sacrificial or reactive in that it protects the thermal barrier coating of the composite by undergoing chemical or physical changes when in contact with a liquid contaminant composition. Thus, the character of the protective coating is sacrificed. The result of the change is to increase either the viscosity or the physical state of the contaminant composition, e.g., liquid CMAS, by dissolving in the composition or reacting with it, to form a by-product material which is not liquid or at least more viscous than the original CMAS.

Such a sacrificial or reactive coating is an outer oxide coating, usually of a metal oxide, deposited on the outer surface of the thermal barrier coating that reacts chemically with the contaminant composition at the surface temperature of the thermal barrier coating. The chemical reaction is one in which the sacrificial oxide coating is consumed, at least partially, and elevates the melting temperature or viscosity of the contaminant composition. The melting temperature of the contaminant composition is preferably increased by at least about 10° C., and most preferably about 50 °–100° C., above the surface temperature of the thermal barrier coating during its operation.

The composition of the sacrificial oxide coating is in part based on the composition of the environmental contaminants and the surface temperature of the thermal barrier coating during operation. Usually, the sacrificial oxide coating contains an element or elements that are present in the liquid contaminant composition.

Suitable sacrificial oxide coatings that react with the CMAS composition to raise its melting temperature or viscosity, include, but are not limited to, alumina, magnesia, chromia, calcia, scandia, calcium zirconate, silica, spinels such as magnesium aluminum oxide, and mixtures thereof.

For instance, it has been found that a sacrificial oxide coating, such as scandia, can be effective in an amount of about 1 weight percent of the total CMAS composition present. Preferably, to raise the CMAS melting temperature from 1190° C. to greater than 1300° C., about 10–20 weight percent of scandia is used for the sacrificial oxide coating.

The protective oxide coating is applied to the thermal barrier coating in an amount sufficient to effectively elevate the melting temperature or the viscosity of substantially all of the liquid contaminant formed on the surface of the composite.

As little as about one weight percent of the oxide coating based on the total weight of the contaminant composition present on the surface of the thermal barrier coating can help prevent infiltration of molten contaminant compositions into openings in the thermal barrier coating. Preferably, about 10–20 weight percent of the sacrificial oxide coating is deposited on the thermal barrier coating. In some instances, the amount of the sacrificial oxide coating deposited may be up to fifty weight percent or a 1:1 ratio of oxide coating to liquid contaminant composition.

The sacrificial oxide coating of the composite is deposited on the thermal barrier coating by methods known in the art, such as sol-gel, sputtering, air plasma spray, organo-metallic chemical vapor deposition, physical vapor deposition, chemical vapor deposition, and the like. Thicknesses of the sacrificial oxide coating can vary from about 0.2 micrometers to about 250 micrometers. The preferred thickness is about 2–125 micrometers. The thickness of the oxide coating is at least in part, determined by the chemistry of the particular oxide coating, the operating temperature of the thermal barrier coating, and the amount and composition of the contaminant. If thick sacrificial oxide coatings are required, i.e., about 125 micrometers or more, a compositionally graded deposit may be necessary to keep internal stresses minimized in order that delamination of the sacrificial coating does not occur.

For purposes of illustrating the use of a specific sacrificial oxide coating in the composite, as well as imparting an understanding of the present invention, the reaction of CMAS composition with the sacrificial oxide coating on a thermal barrier coating is described at operating temperatures of about 1200° C. or higher.

The chemical composition of the CMAS eutectic mixture was determined by electron microprobe analysis of infiltrated deposits found on thermal barrier coated engine parts where deposit-induced damage to the thermal barrier coating had been observed. Analysis indicated that 127 micron (5 mils) of CMAS-like deposits (~34 $mg/cm^2$ assuming a density of 2.7 $g/cm^3$) can form on thermal barrier coating surfaces. The CMAS deposits evaluated were typically in the compositional range (weight %): 5–35% CaO, 2–35% MgO, 5–15% $Al_2O_3$, 5–55% $SiO_2$, 0–5% NiO, 5–10% $Fe_2O_3$, however the content of the ubiquitous $Fe_2O_3$ can be as large as 75 wt%. An average composition for such deposits (weight %: 28.7% CaO, 6.4% MgO, 11.1% $Al_2O_3$, 43.7% $SiO_2$, 1.9% NiO, 8.3% $Fe_2O_3$) was synthesized in the laboratory and used as a standard CMAS for the purpose of evaluating protective coatings. Differential thermal analysis of actual CMAS deposits and the synthesized CMAS indicated that the onset of melting occurs at about 1190° C. with the maximum of the melting peak occurring at about 1260° C. Thermal testing of candidate protective coatings for thermal barrier coatings against the laboratory synthesized CMAS composition were carried out at about 12600° C.

Viscosity data on a similar CMAS composition indicates that the viscosity of CMAS is about 4 Pa•s (Pascal second) at 12600° C. This fluid phase infiltrates the TBC and induces TBC damage either by freezing-induced spallation or by high temperature chemical attack induced destabilization. Laboratory experiments with unprotected thermal barrier coatings indicate that, under isothermal conditions 8 mg CMAS/cm² is sufficient to cause entire thermal barrier coating layers to spall off.

In the practice of this invention, if the surface temperature of the thermal barrier coating during operation is about 1200° C., then it is preferred to increase the melting temperature of the CMAS eutectic mixture to at least about 1210° C., and most preferably, to increase the CMAS melting temperature to about 1260°–1310° C. The melting temperature of the CMAS composition should be raised at least 10° C. higher than the surface temperature of the thermal barrier coating during its operation.

The following examples further serve to describe the invention.

EXAMPLES

Composites with sacrificial oxide coatings on thermal barrier coated parts were investigated to prevent the infiltration of environmentally deposited mixtures of oxides of calcium, magnesium, aluminum, and silicon (CMAS).

Studies were conducted using differential thermal analysis (DTA) and thermodynamic calculation to assess the ability of candidate sacrificial materials to react with CMAS and increase the melting temperature such that infiltration of the CMAS does not occur into the thermal barrier coating during service. Viscosity measurements were used to assess the ability of sacrificial oxide coatings to react with CMAS, to increase the liquid phase viscosity, and thereby, to limit physical infiltration into the thermal barrier coating microstructure.

Candidate composite sacrificial oxide coating compositions were deposited on thermal barrier coatings and assessed for CMAS infiltration resistance using metallography, SEM and electron microprobe chemical analysis. The above testing was conducted under laboratory furnace test conditions (isothermal).

Sacrificial oxide coatings that were deposited by the sol-gel, air plasma spray, sputtering, and MOCVD methods were: scandia, calcium zirconate, calcium oxide (CaO), aluminum oxide ($Al_2O_3$), magnesium oxide (MgO), and silicon oxide ($SiO_2$).

The effectiveness of protective coatings in preventing CMAS-infiltration-induced thermal barrier coating damage was tested by comparing the infiltration resistance of protected and non-protected thermal barrier coated substrates which were thermally cycled in the presence of surface deposits of CMAS. In these experiments, 8 mg/cm² of ground pre-reacted CMAS was deposited on masked areas of the thermal barrier coated substrates. A thermal cycle consisted of heating the samples to 1260° C. in 10 minutes, holding it at 1260° C. for 10 minutes, followed by cooling it to room temperature in 30 minutes. After each cycle the samples were inspected with the unaided eye and at 50× using a stereo microscope. This cycle was repeated several times. After completion of thermal testing, the samples were sectioned, metallographically polished, and inspected using bright field and dark field optical microscopy.

EXAMPLE 1

Example 1 demonstrates the effect of CMAS on a thermal barrier coated part without a sacrificial oxide protective coating. Non-protected thermal barrier coating samples tested in the above-mentioned fashion exhibit visible CMAS induced thermal barrier coating swelling and cracking (visible on sample edge with stereomicroscope). Metallographic preparation and inspection of the non-protected samples shows CMAS induced thermal barrier coating densification, cracking and exfoliation.

EXAMPLE 2

Differential thermal analysis experiments found that about 10 weight percent of scandia in CMAS raises the melting temperature of the CMAS eutectic mixture from 1190° C. to 1300° C. Therefore, a 1 mil thick scandia coating was air plasma spray deposited on a thermal barrier coated substrate. Eight mg/cm² CMAS was deposited on the top surface of the scandia protected thermal barrier coating. Thermal cycling to 1260° C. showed that scandia reduced CMAS infiltration into the thermal barrier coating. There were large droplets of CMAS remaining on top of the sample. At 20× magnification there were no normally observed CMAS induced edge cracks in the thermal barrier coating.

Example 3

Differential thermal analysis found that magnesia or calcia additions increased the melting temperatures for CMAS compositions when 1:1 by weight additions were made. Twenty weight percent additions of magnesia or calcia cause the differential thermal analysis curves for CMAS eutectic mixtures to exhibit two separate melting peaks: at 1254° C. and at 1318° C. for magnesia, and 1230° C. and 1331° C. for calcia. Thermal barrier coatings protected with magnesia or calcia coatings exhibited less CMAS eutectic mixtureinduced exfoliation than unprotected thermal barrier coating samples when exposed to 8 mg/cm² CMAS eutectic mixtures during furnace cycle testing.

A 5 mil thick magnesium oxide coating was air plasma spray coated on a thermal barrier coating sample and tested using the above described method. Eight mg/cm² of the CMAS composition was applied to the magnesia coated thermal barrier coating. The CMAS composition did not infiltrate the thermal barrier coating extensively after a thermal cycle to 1260° C. No CMAS induced edge cracking of the thermal barrier coating was observed at a magnification of 20× in the CMAS affected area.

EXAMPLE 4

A 3 mil thick calcium zirconate coating was air plasma spray coated on a thermal barrier coating sample and tested using the method described in example 1. After thermally cycling the coating with the addition of 8 mg/cm² CMAS to 1260° C., metallography showed that CMAS composition was retained on top of the thermal barrier coating, and there was no apparent infiltration into the thermal barrier coating.

EXAMPLE 5

Differential thermal analysis experiments found that alumina additions increase the CMAS composition melting temperature upon heating when 1:1 by weight additions of alumina to the CMAS composition are made. One to one additions elevate the onset of melting for CMAS compositions to a temperature greater than 1345° C. For example, a 5 mil air plasma spray deposited film of alumina minimized the infiltration of 8 mg/cm² CMAS composition after heat treatment at 1260° C. for 1 hour.

EXAMPLE 6

The ability of secondary protective oxides to increase the viscosity was tested. For a given exposure time, an increase in CMAS viscosity will decrease the infiltration depth into the thermal barrier coating. Survey studies of viscosity changes in CMAS resulting from oxide additions were made. Simplistic viscosity type measurements utilized in testing of porcelain enamels were employed for ranking purposes. In the enameling test, pellets made from mixtures of CMAS with varying amounts of candidate oxides were placed on a horizontal platinum sheet and melted. The platinum sheet was rotated to a vertical position for a precise amount of time (to allow viscous flow) and then rotated back to a horizontal position (to stop viscous flow) and removed from the furnace. The approximate viscosity can be calculated from the length of the flow line and the flow time. The relative change in CMAS viscosity with oxide addition can be determined by measuring the change in flow line length with the addition of various oxides. Candidate oxides which increased the CMAS viscosity (among them alumina, magnesia, calcia, and calcium zirconate) were then deposited on thermal barrier coated substrates and thermally tested with CMAS deposits. The results of the alumina, magnesia, and calcium zirconate protective coatings are described in examples 2, 3 and 4.

The practice of this invention makes it possible to extend the effective life of gas turbine engine thermal barrier coatings at a specific set of operating parameters including operating temperature and operating environment. It also provides a means to provide for engine designs which impose increased thermal burdens on thermal barrier coatings such as reduced cooling of thermal barrier coated parts or exposure of such parts to higher temperature input, i.e., effective increase of operating temperatures for the engine system. Accordingly, the practice of this invention provides for substantial enhancement of the functions of currently available thermal barrier coatings under more rigorous thermal assault as demands for performance escalate.

What is claimed:

1. A composite comprising ceramic thermal barrier coating on a part with a continuous sacrificial oxide coating adjacent to an outer surface of the thermal barrier coating where said thermal barrier coating is a chemically stabilized zirconia selected from the group consisting of yttria-stabilized zirconia, scandia-stabilized zirconia, calcia-stabilized zirconia, and magnesia-stabilized zirconia, where the sacrificial oxide coating is about 0.2–250 micrometers thick, where the sacrificial oxide coating is not mixed with zirconia, and where said sacrificial coating reacts with contaminant compositions to prevent contaminant infiltration into the thermal barrier coating.

2. A composite according to claim 1 where the sacrificial oxide coating is selected from the group consisting of alumina, magnesia, chromia, calcia, calcium zirconate, scandia, silica, magnesium aluminum oxide, and mixtures thereof.

3. A composite according to claim 1 where the part is an alloy selected from the group consisting of nickel based alloys, cobalt based alloys, iron based alloys, and mixtures thereof.

4. A protected thermal barrier coated part comprising a part selected from the group consisting of nickel based alloys, cobalt based alloys, iron based alloys, and mixtures thereof, with a thermal barrier coating selected from the group consisting of a chemically stabilized zirconia selected from the group consisting of yttria-stabilized zirconia, scandia-stabilized zirconia, calcia-stabilized zirconia, and magnesia-stabilized zirconia, on said part and a sacrificial oxide coating selected from the group consisting of alumina, magnesia, chromia, calcia, calcium zirconate, scandia, silica, magnesium aluminum oxide, and mixtures thereof, in an amount of about 0.2–250 micrometers thick on an outer surface of said thermal barrier coating, where the sacrificial oxide coating is not mixed with zirconia, and where said sacrificial coatinq reacts with contaminant compositions to prevent contaminant infiltration into the thermal barrier coating.

5. A composite comprising a substrate, a bond coat, a ceramic thermal barrier coating selected from the group consisting of a chemically stabilized zirconia selected from the group consisting of yttria-stabilized zirconia, scandia-stabilized zirconia, calcia-stabilized zirconia, and magnesia-stabilized zirconia and on an outer surface of the thermal barrier coating a continuous sacrificial oxide coating in an amount of about 0.2–250 micrometers thick, where the sacrificial oxide coating is not mixed with zirconia, and where said sacrificial coating reacts with contaminant compositions to prevent contaminant infiltration into the thermal barrier coating.

6. An article of manufacture for use in gas turbine engines comprising a part having a surface covered with a thermal barrier coating, where the thermal barrier coating is selected from the group consisting of a chemically stabilized zirconia selected from the group consisting of yttria-stabilized zirconia, scandia-stabilized zirconia, calcia-stabilized zirconia, and magnesia-stabilized zirconia, and said thermal barrier coating having an outer surface covered with a sacrificial oxide coating in an amount of about 0.2–250 micrometers, where the sacrificial oxide coating is selected from the group consisting of alumina, magnesia, chromia, calcia, calcium zirconate, scandia, silica, magnesium aluminum oxide, and mixtures thereof, and where said sacrificial coatinq reacts with contaminant compositions to prevent contaminant infiltration into the thermal barrier coating.

\* \* \* \* \*

UNITED STATES PATENT AND TRADEMARK OFFICE
CERTIFICATE OF CORRECTION

PATENT NO. : 5,773,141

DATED : June 30, 1998

INVENTOR(S) : Wayne Charles Hasz et al.

It is certified that error appears in the above-identified patent and that said Letters Patent is hereby corrected as shown below:

Column 5, line 2, cancel "12600°C" and substitute --1260°C--.

Column 5, line 5, cancel "12600°C" and substitute --1260°C--.

Signed and Sealed this

Seventeenth Day of November, 1998

Attest:

BRUCE LEHMAN

Attesting Officer
Commissioner of Patents and Trademarks